Nov. 29, 1949  R. E. BESWICK  2,489,613
QUICK ACTION NUT
Filed April 9, 1946  3 Sheets-Sheet 1
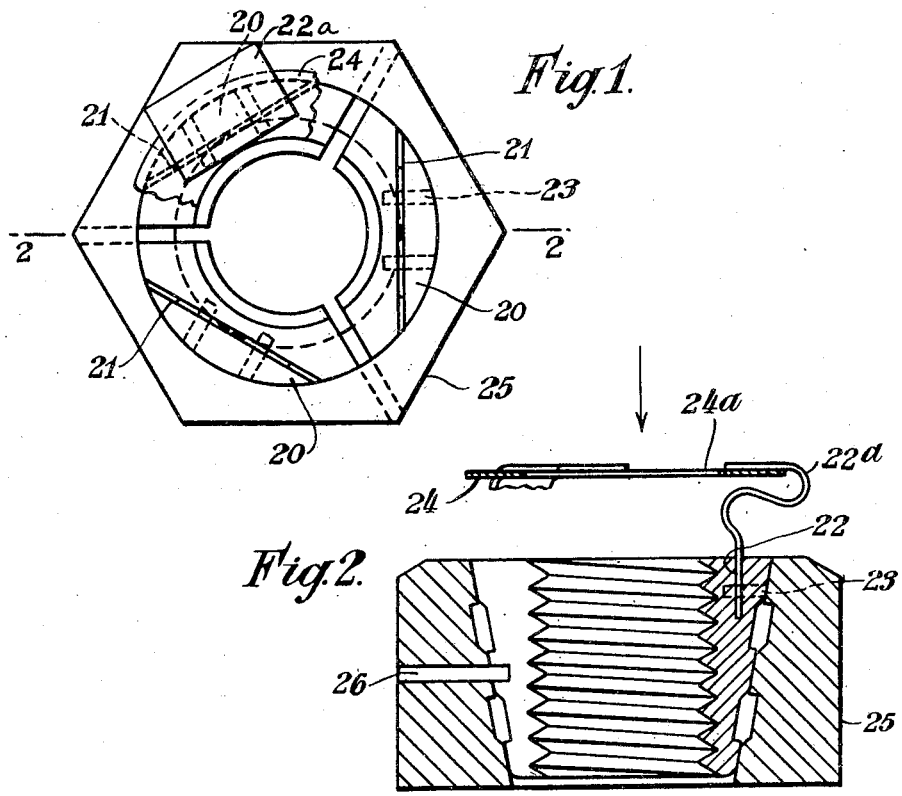
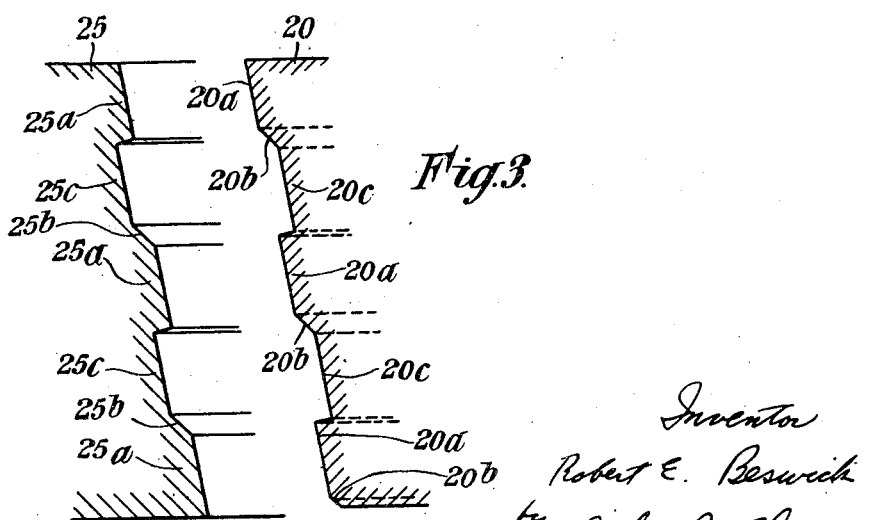
Inventor
Robert E. Beswick
by John P. Chandler
his Attorney Nov. 29, 1949 R. E. BESWICK 2,489,613
QUICK ACTION NUT
Filed April 9, 1946 3 Sheets-Sheet 2
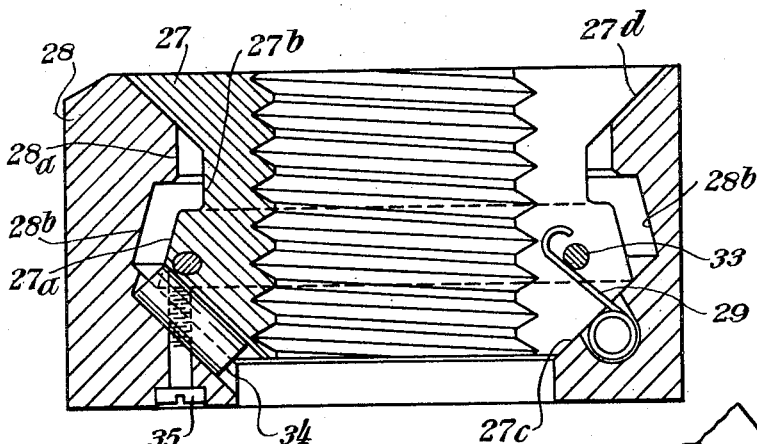
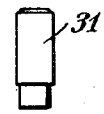
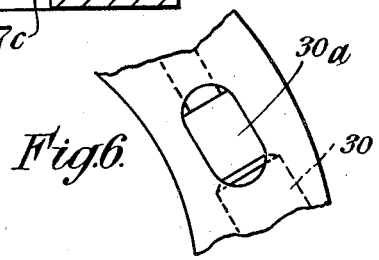
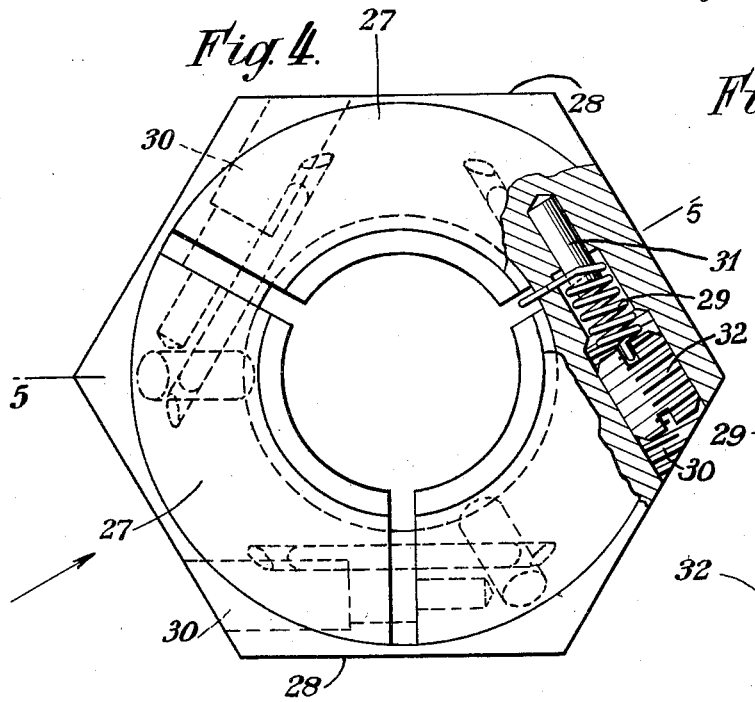
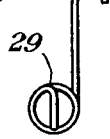
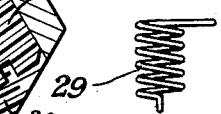
Inventor
Robert E. Beswick
by John P. Chandler
his Attorney Nov. 29, 1949 R. E. BESWICK 2,489,613
QUICK ACTION NUT
Filed April 9, 1946 3 Sheets-Sheet 3
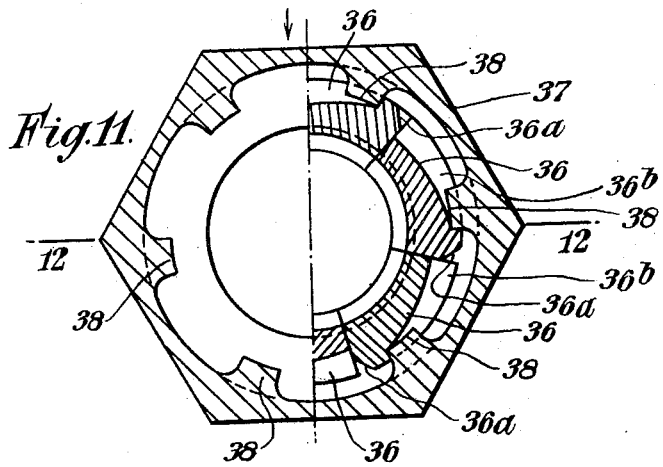
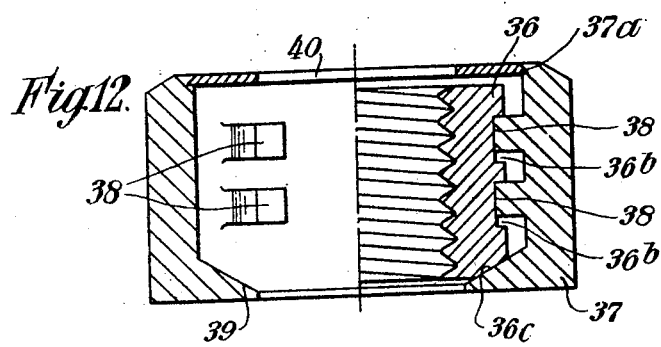
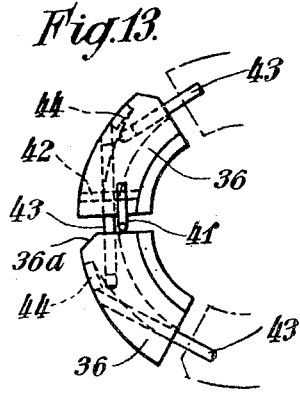
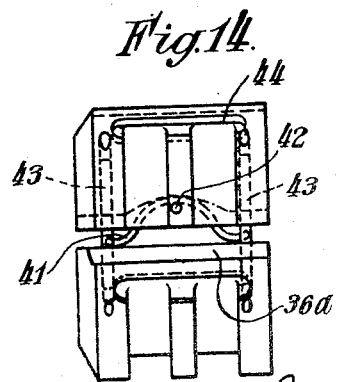
Inventor
Robert E. Beswick
by John P. Chandler
his Attorney Patented Nov. 29, 1949

2,489,613

UNITED STATES PATENT OFFICE 2,489,613

QUICK ACTION NUT

Robert Eardley Beswick, Marple, England

Application April 9, 1946, Serial No. 660,642
In Great Britain April 14, 1945

9 Claims. (Cl. 85—33)

This invention relates to quick action nuts, that is to say nuts which can be secured or released by a small angle turn and of the kind comprising a plurality of segments and a ring-like housing therefor adapted to receive a key or spanner, the segments being relatively movable within but adapted to be turned by the housing and the segments and housing having relatively inclined complementary interengaging formations which on relative movement permit the said segments to open and disengage from the threads of the bolt or cause them to close into engagement with such threads and have spring means to urge them into the open position. An example of such a nut is described in my prior United States Patent No. 2,367,480.

The object of the present invention is an improved construction of quick action nut of the kind above referred to. In particular, as compared with the construction of my said earlier invention the improvements which have been aimed at are:

(a) To avoid or reduce the length of the original projecting spring cage so bringing the dimensions more clearly to those of a standard nut.

(b) To avoid the difficult operation of forming internal hexagonal cones as in the ring-like housing of the earlier patent.

(c) To render the nut more proof against loosening, for which purpose the angle of the internal cone has been reversed.

According to the invention, a quick action nut of the kind above referred to is characterised in that the said formations are arranged in a plurality of spaced steps adapted to limit relative axial movement of the segments in the housing.

The nut may be further characterised in that the inclined complementary interengaging formations comprise a plurality of right conical frusta in stepped form; or in that further inclined complementary interengaging formations are provided between the said spaced steps with quick angle portions arranged so that relative axial movement produces quick initial closing or permits quick final opening movement of the segments; or in that the complementary interengaging formations are arranged on complementary faces of annular ribs shaped as right conical frusta separated by intervening grooves with quick angle portions of similar shape as bevel-like formations on said ribs, so that the ribs on the segments can move axially along the ribs of the housing and finally into the intervening grooves of the housing for final quick opening movement of the segments; or in that the inclined complementary interengaging formations are of ratchet tooth shape for each segment combined with complementary tongue and groove formation between the segments and housing so that relative rotational movement produces closing or permits opening of the segments whilst the tongue and groove formation limits relative axial movement of the segments in the housing; or in that the segments are permitted axial as well as rotational, movement in the housing and in that further complementary inclined faces are provided so that such permitted axial movement also produces closing or permits opening of the segments; or in that the ratchet shaped complementary engaging formations are formed as grooves in the one part and projecting tongues on the other part.

In the accompanying drawings:

Fig. 1 is a plan view of one example of quick action nut made in accordance with the invention;

Fig. 2 is a longitudinal section on line 2—2 of Fig. 1;

Fig. 3 is an enlarged longitudinal section showing details of the inter-engaging step formations;

Fig. 4 is a plan view of another modification of the invention showing the segment connecting pins in part.

Fig. 5 is a section on line 5—5 of Fig. 4;

Fig. 6 is a detail fragmentary plan;

Figs. 7, 8, 9 and 10 are detail views of parts shown in Figs. 4 and 5;

Fig. 11 is a part sectional plan of another modification of the invention showing the housing with the internal segments in the right-hand half only;

Fig. 12 is a sectional elevation on line 12—12 of Fig. 11;

Fig. 13 is a plan of two of the segments shown in Figs. 11 and 12;

Fig. 14 is a side view of Fig. 13.

As shown in Figs. 1 to 3, the improved nut comprises an internal threaded part formed of three segments 20 each formed on its upper face with a chord-like slit 21 in which is located the end of a spring leg 22 secured by pins 23. The upper ends of the legs are shaped at 22a as a "swan neck" to give maximum flexibility for minimum overall length, and they are over-laid on and welded to a washer 24 having a clearance hole 24a. The three segments 20 are enclosed in an outer member or housing 25 which is externally of the usual hexagon nut shape. The complementary engaging faces of the outer faces of the segments 20 and the inner face of the housing 25 are circular in section at any point and as shown in detail in Fig. 3 they have each a plurality of steps. The segments have three annular projecting ribs 20a, the under corner of each of which has a bevel 20b of 45 degrees angle. The external periphery of the three ribs 20a are parts of the same cone. The inner face of the housing 25 has similar projecting ribs 25a of conical shape with upper edges bevelled at 25b. Between the ribs 20a are spaces 20c adapted to mate with the projecting ribs 25a when the segments are axially displaced, whilst between the ribs 25a are similar spaces 25c adapted to receive the ribs 20a of the segments. Normally, with the segments in their closed position for engaging the threads of a bolt, the ribs 20a and 25a are in contact. In order to constrain the segments to turn with the housing, pins 26 are provided.

In operation, to prepare the nut for fitting to a bolt, the segments are moved radially out of the housing for a distance equal to half the pitch of the ribs, so that the ribs 20a may engage the recesses 25c, and the ribs 25a engage the complementary recesses 20c under the expanding force of the spring legs 22. The nut can then be slid over the threads of the bolt until it is approximately against the face onto which it is to be tightened. Pressure is then applied to the washer 24 in the direction indicated by the arrow in Fig. 2, and housing 25 so that the bevelled faces 20b and 25b produce quick closing action of the segments onto the bolt. Finally the conical ribs 20a and 25a engage and produce final closing of the segments when the parts assume the position shown in Fig. 2. The nut may then be tightened as an ordinary nut using a key or box spanner. Frictional contact between the ribs 20a and 25a supplement drive between the segments and the housing, which initially is provided by the pins 26. For this purpose, the angle of the conical stepped portions is relatively small to provide a cone clutch effect. Similarly to release the nut, it is first slackened by the use of a key or spanner until the segments can be moved axially in the housing to allow the complementary ribs and recesses to engage. In such position the said ribs and recesses normally prevent further axial movement of the segments so that the segments remain in their housing as a unit part thereof.

As shown in Figs. 4 to 10, the improved nut comprises an internal threaded part consisting of three segments 27 located in a housing 28. The segments have an annular rib 27a, an annular recess 27b and steep lower and upper conical faces 27c and 27d. The housing is formed with an annular rib 28a, an annular recess 28b and with steep conical faces shown in Fig. 5 in contact with the faces 27c and 27d above described. The rib 27a and recess 28b are complementary in shape and have a reverse conical shape. The segments are normally forced outwardly into the housing by springs 29 shown in detail in Figs. 8 and 9 which are each located in a hole 30 and recess 30a (see Fig. 6) and located therein at one end by a pin 31 and retained and tensioned by a grub screw 32. The hooked ends of the springs engage pins 33 located in holes between the segments. The pins 33 have also the important function of maintaining the segments so as to ensure continuity of thread. In order to constrain the segments to turn with the housing, after assembly therein, drill holes are made half intersecting the inclined faces 27c and the complementary face on the housing; round keys 34 are inserted in such holes which are secured by set screws 35, for which holes are drilled and tapped after the keys are in position.

In use, the segments are normally in an "open" position under the force of the springs 29. The nut is slid onto the bolt until it is against the face onto which it is to be tightened. Lateral pressure, for example in the direction of the arrow in Fig. 4, is now applied to engage the threads of the segments at one side with the threads of the bolt and at the same time the housing is turned so that the segments are drawn down in the housing until they reach the closed position as shown in Figs. 4 and 5 when the nut can be tightened by key or spanner in normal manner. To release the nut it merely requires to be turned by key or spanner when the springs 29 move the segments 27 to the "open" position and the nut can then be drawn off the bolt.

In the modification shown in Figs. 11 to 14 the nut comprises an internal threaded part formed of six segments 36 located in a housing 37 and capable of limited axial and rotary movement therein. As shown in the left hand halves of Figs. 11 and 12 the housing has a plurality of projections 38 and a bevelled bottom flange 39. At its upper end, the housing is adapted to be part closed by a washer 40, to retain the segments, such washer being secured by a swaging or pressing operation to turn over an edge at 37a. The segments are bevelled at 36a at their leading edges and each have cam-shaped annular grooves 36b adapted to be engaged with the projections 38 as shown particularly in Figs. 11 and 12. At their lower ends the segments have a conical bevel 36c to engage the bevelled flange 39 of the housing. Between the segments are springs 41 each secured by a pin 42, and guide pins 43 so that all the segments move together axially as a unit. Recesses 44 are cut in the sides of the segments to form shoulders to engage the projections 38 as shown in Fig. 11.

In operation, the nut is applied in the same manner as described above for the second example of the invention, engagement of the threads being effected by applying lateral pressure, for example in the direction of the arrow shown in Fig. 11, whilst giving partial rotation of the housing to cause the segments to move inwardly and downwardly in the housing under the action of the projections 38 in the grooves 36b. The end bevel 36c and flange 39 also help this inward movement when the nut is tightened, which can be done in normal manner with a key or spanner. To release the nut, it will be given a partial turn using a key or spanner, when the segments will be released and allowed to open into the housing under the action of their springs. When in the open position, the ribs, formed by the cam grooves 36b engaging with the projections 38 limit both axial and rotary movement and release is obtained with only a small angle of turn.

Obviously, the invention is not limited to the examples above described, as modifications therein may be made without departing from the nature of the invention. For instance the alternative constructional features of the several examples can be interchanged to make new combinations. Also the bevelled flange 39 and end bevel 36c can be omitted and the nut made so there is no relative axial movement except that the combination tends to provide a frictional lock.

What I claim is:

1. A quick action nut of the kind comprising a plurality of segments and a ring-like housing therefor, adapted to receive a key or spanner, the segments being relatively movable within but adapted to be turned by the housing and the segments and housing having relatively inclined complementary interengaging formations which on relative movement permit the said segments to open or cause them to close, and having spring means to urge them into the open position, characterised in that the said formations are arranged in a plurality of spaced steps adapted to limit relative axial movement of the segments in the housing.

2. A quick action nut of the kind comprising a plurality of segments and a ring-like housing therefor, adapted to receive a key or spanner, the segments being relatively movable within but adapted to be turned by the housing and the segments and housing having relatively inclined complementary interengaging formations which on relative movement permit the said segments to open or cause them to close, characterised in that the said inclined complementary interengaging formations comprise a plurality of right conical frusta in stepped form adapted to limit relative axial movement of the segments in the housing.

3. A quick action nut of the kind comprising a plurality of segments and a ring-like housing therefor, adapted to receive a key or spanner, the segments being relatively movable within but adapted to be turned by the housing and the segments and housing having relatively inclined complementary interengaging formations which on relative movement permit the said segments to open or cause them to close, characterised in that the said formations are arranged in a plurality of spaced steps adapted to limit relative axial movement of the segments in the housing and in that further complementary interengaging formations are provided between the said spaced steps with quick angle portions arranged so that relative axial movement produces quick initial closing or permits quick final opening movement of the segments.

4. A quick action nut of the kind comprising a plurality of segments and a ring-like housing therefor, adapted to receive a key or spanner, the segments being relatively movable within but adapted to be turned by the housing and the segments and housing having relatively inclined complementary interengaging formations which on relative movement permit the said segments to open or cause them to close, said complementary interengaging formations being formed on complementary faces of annular ribs shaped as right conical frusta separated by intervening grooves with quick angle portions of similar shape as bevel-like formations on said ribs, so that the ribs on the segments can move axially along the ribs of the housing and finally into the intervening grooves of the housing for final quick opening movement of the segments, the interengagement of the ribs and grooves, as the segments move axially to open, operating to limit further axial movement of the segments in the housing.

5. A quick action nut of the kind comprising a plurality of segments and a ring-like housing therefor, adapted to receive a key or spanner, the segments being relatively movable within but adapted to be turned by the housing and the segments and housing having relatively inclined complementary interengaging formations which on relative movement permit the said segments to open or cause them to close, said inclined complementary interengaging formations being of ratchet tooth shape for each segment combined with complementary tongue and groove formation between the segments and housing so that relative rotational movement produces closing or permits opening of the segments whilst the tongue and groove formation limits relative axial movement of the segments in the housing.

6. A quick action nut of the kind comprising a plurality of segments and a ring-like housing therefor, adapted to receive a key or spanner, the segments being relatively movable within but adapted to be turned by the housing and the segments and housing having relatively inclined complementary interengaging formations which on relative movement permit the said segments to open or cause them to close, said inclined complementary interengaging formations being of ratchet tooth shape for each segment combined with complementary tongue and groove formation between the segments and housing so that relative rotational movement produces closing or permits opening of the segments whilst the tongue and groove formation limits relative axial movement of the segments in the housing, said tongue and groove formation being proportioned to permit axial as well as rotational movement between the segments and housing in combination with further complementary inclined faces whereby such axial movement also produces closing or permits opening of the segments.

7. A quick action nut of the kind comprising a plurality of segments and a ring-like housing therefor, adapted to receive a key or spanner, the segments being relatively movable within but adapted to be turned by the housing and the segments and housing having relatively inclined complementary interengaging formations which on relative movement permit the said segments to open or cause them to close, said complementary interengaging formations being of ratchet tooth shape cut as grooves in the segments and projections in the housing to engage therewith so that relative rotational movement produces closing or permits opening of the segments whilst limiting relative axial movement of the segments in the housing.

8. A quick action nut of the kind comprising a plurality of segments and a ring-like housing therefor, adapted to receive a key or spanner, the segments being relatively movable within but adapted to be turned by the housing and the segments and housing having relatively inclined complementary interengaging formations which on relative movement permit the said segments to open or cause them to close, said complementary interengaging formations on each part comprising relatively projecting annular parts of a cone separated by grooves with complementary bevelled edges on such projections of the segments and housing for quick action initial closing and final opening movement of the segments in the housing.

9. A quick action nut of the kind comprising a plurality of segments and a ring-like housing therefor, adapted to receive a key or spanner, the segments being relatively movable within but adapted to be turned by the housing and the segments and housing having relatively inclined complementary interengaging formations which on relative movement permit the said segments to open or cause them to close, and having spring means to urge them into the open position, characterized in that the said formations are arranged in a plurality of spaced steps adapted to limit relative movement of the segments in the housing.

ROBERT EARDLEY BESWICK.

No references cited.